(No Model.)   2 Sheets—Sheet 1.

C. M. HAESKE.
DUMPING WAGON.

No. 600,071.  Patented Mar. 1, 1898.

Witnesses  
Inventor  
Charles M. Haeske (No Model.) 2 Sheets—Sheet 2.
C. M. HAESKE.
DUMPING WAGON.
No. 600,071. Patented Mar. 1, 1898.
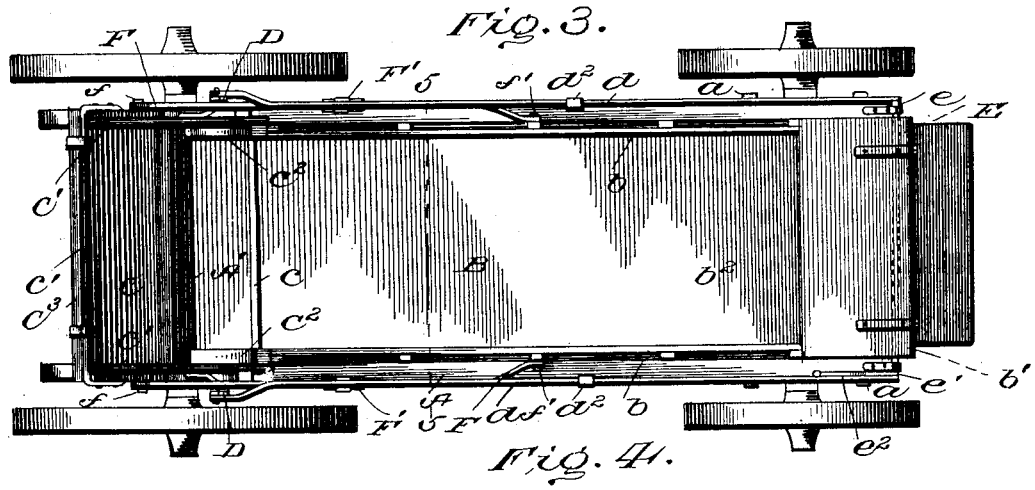
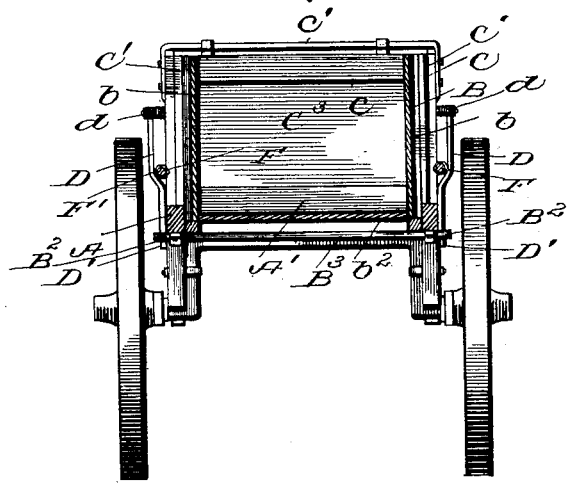
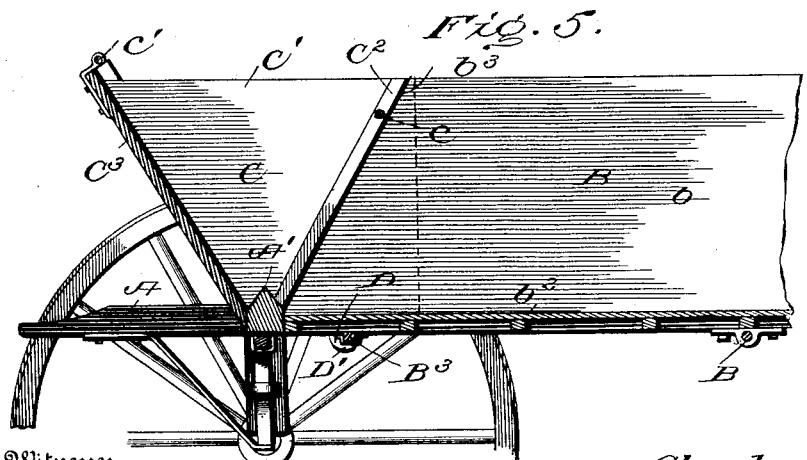
Witnesses
Inventor
Charles M. Haeske
by Alexander & Dowell
Attorneys

UNITED STATES PATENT OFFICE.

CHARLES M. HAESKE, OF SOUTH BEND, INDIANA.

DUMPING-WAGON.

SPECIFICATION forming part of Letters Patent No. 600,071, dated March 1, 1898.

Application filed July 31, 1897. Serial No. 646,628. (No model.)

*To all whom it may concern:*

Be it known that I, CHARLES M. HAESKE, of South Bend, in the county of St. Joseph and State of Indiana, have invented certain new and useful Improvements in Dumping-Wagons; and I hereby declare that the following is a full, clear, and exact description thereof, reference being had to the accompanying drawings, which form part of this specification.

This invention is an improvement in dumping-wagons; and it consists in the novel construction and combination of parts hereinafter described and claimed, and the accompanying drawings illustrate an efficient wagon constructed in accordance with the invention.

Figure 1:
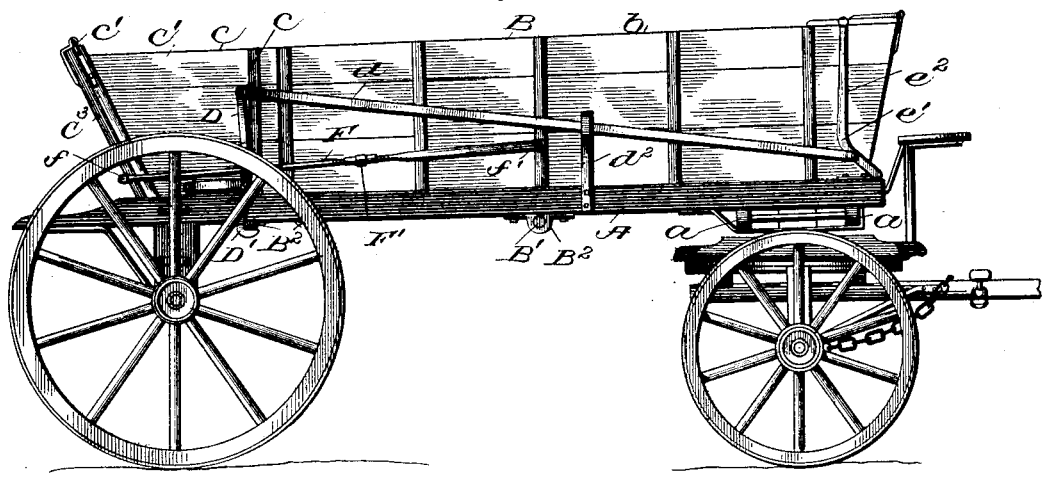
Figure 2:
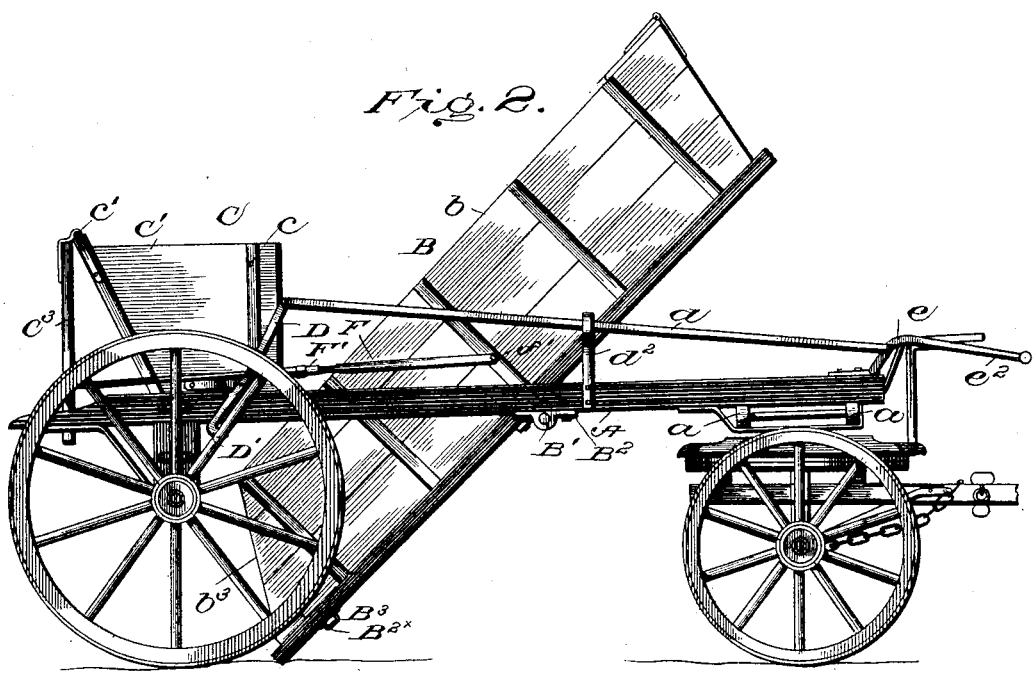

Referring to said drawings, Figure 1 is a side elevation of the wagon in condition for filling. Fig. 2 is a similar view thereof "dumped." Fig. 3 is a top plan view. Fig. 4 is a transverse section on line 5 5, Fig. 3. Fig. 5 is a detail longitudinal section through the rear part of the wagon.

The running-gear of the wagon is composed of opposite side beams A A, which are connected at front by bars $a\ a$, to which the upper part of the fifth-wheel and the king-bolt is attached, whereby the front ends of the beams are mounted on the front axle, as shown. Near their rear ends the beams A A are connected by a transverse bar A', which is preferably double-beveled on its upper edge, as shown in Fig. 5, to prevent lodgment thereon of any contents of the body, and under said bar is the rear axle, which is preferably bent, as indicated in the drawings. The beams A A and bars $a$ and A' constitute the frame of the running-gear and no reach is employed, as shown.

The body of the wagon is composed of two sections B and C. Section B is the larger box or dumping section and extends practically from the bar A' to the front ends of beams A and is formed with bottom $b^2$, front $b'$, and sides $b$, as usual, or in any preferred manner, and is mounted near its center upon a transverse shaft B', which is journaled in suitable hangers or bearings $B^2$ on beams A, as shown.

The rear portion C of the body is mounted directly over the rear axle and is composed of opposite side pieces C' C', which are rigidly fastened to the beams A A and are braced by suitable tie-rods $c\ c'$, and from the latter is suspended the end-gate $C^3$, which is adapted to fit closely against the inclined rear edges of the sides C' and against the rear edge of bar A', as shown.

To the inner sides of pieces C' are secured inclined cleats $C^2$, against which the beveled ends $b^3$ of the sides $b$ of section B fit when said section is in elevated position, as shown in Fig. 1, the ends of sides $b$ being adapted to fit between the side pieces C', as shown.

To the opposite beams A A, near sides C', are pivoted the latch-levers D, the lower ends of which depend below the beams and are provided with hooks D', adapted to catch under pins $B^2$, projecting from the sides of box B, at the rear end thereof, preferably a bar $B^3$ being secured under the rear end of box B, with its ends projecting so as to be engaged by said latch-levers.

The upper ends of lever D are connected to rods $d$, which extend forward through guides $d^2$ and are connected to arms $e\ e'$ on a shaft E, which is journaled in suitable bearings or keepers on the front ends of beams A, as shown. The arm $e'$ is extended into a hand-lever $e^2$, by which the shaft E can be rocked, and thus cause latches D to engage or disengage pins $B^2$.

The swinging end-gate $C^3$ is automatically opened by the movement of section D by means of rods F, which are pivoted at one end to pins $f$, projecting from the ends of the end-gate, and at the other end to pins or bolts $f'$, attached to the side of box B, as shown.

From the foregoing description and drawings it is evident that as the box is dumped these rods will push the gate $C^3$ open, and as the box is pulled to its loading position these rods will draw the end-gate toward the stationary section of the body and close it thereagainst. The cross-bar A' of triangular section, which joins the two stationary sides near their bottom, fills the space between the lower edge of the gate and the rear edge of the box-bottom.

Assuming the box to be pulled down into loading position, the pins $B^2$ come up under and are limited in their rise by the side beams A. Lever $e^2$ is then pulled up. This rocks latch-levers D and their L-shaped ends D' pass forward and under pins $B^2$, thus slightly raising the box and holding the pins firmly against the side beams. The wagon-body is then as shown in Fig. 1. The arms $e\ e'$ are bent and rods $d$ are attached thereto in such a manner that when lever $e^2$ is thrown up the points of connection between the levers D and arms $e\ e'$ are approximately in a straight line, thus making the device substantially self-locking.

When the wagon is to be dumped, lever $e^2$ is thrown forward, thus rocking levers D and disengaging D' from $B^2$, allowing the box B to drop and rods F to open the gate, as shown in Fig. 2. The team is then started ahead and the entire load falls out of the box onto the ground. The object of using the inclined end-gate with its automatic opening device is to start the load. In a body with a vertical division and a stationary end-gate, as soon as the dumping-box opens if the wagon happens to be loaded with brick they will frequently bind together or arch and the wagon will not unload until the arch is broken; but by my construction the end portion of the load—of brick, for instance—is immediately dropped out upon the opening of the end-gate, which prevents any wedging or arching of the remainder of the load, which falls freely to the ground. There are two rods $d$, one on each side, to operate two latch-levers D, which catch under the two pins or projections $B^2$ to hold the loaded box B in place. They are both operated, however, by the same lever $e^2$. The same thing is true of the action of the end-gate. There are two rods F. These rods F are preferably made in sections adjustably united by means of double-threaded nuts F', as shown.

Having thus described my invention, what I therefore claim as new, and desire to secure by Letters Patent thereon, is—

1. In a dumping-wagon, the combination of the opposite side beams, the bar connecting said beams, and side pieces fixed to the beams at opposite ends of said bar, together forming a fixed end section of the body; with a dumping-box forming the front part of the body and fulcrumed on the beams, said dumping-box having its open rear end adapted to fit against said side pieces and bar when in filling position, a swinging end-gate suspended from said rear section, means for locking the said dumping-box in filling position, and means for releasing the gate when the box is dumped, substantially as and for the purpose described.

2. In a dumping-wagon, the combination of the opposite side beams, the bar connecting said beams, and the body composed of side pieces fixed to the beam at opposite ends of said bar, the dumping-box fulcrumed on the beams, having its open end adapted to fit against said pieces and bar when in filling position, and the swinging end-gate fitted to the rear edges of the side pieces and bar; with rods connecting said gate to the dumping-section, so that the gate is operated from the latter, and means for locking the dumping-section in filling position, substantially as described.

3. In a dumping-wagon, the combination of the opposite side beams, the double-beveled bar uniting said beams, and side pieces fixed to the beams at opposite ends of said bar, said bar and side pieces forming a fixed rear end section of the body; the dumping-box forming the front part of the body fulcrumed on the beams and having its open rear end adapted to fit against said pieces and bar when in filling position; and a swinging end-gate suspended from said rear section; with the latch-levers, connecting-rods, and rock-shaft for locking said dumping-box in filling position, and rods connecting the gate to said box whereby the gate is operated, substantially as and for the purpose described.

4. In a dumping-wagon, the combination of the opposite side beams, the double-beveled bar uniting said beams, and the body composed of side pieces fixed to the beams at opposite ends of said bar, the dumping-box fulcrumed on the beams having its open end adapted to fit against said pieces and bar when in filling position, and the swinging end-gate fitted to the rear edges of the side pieces and bar; with rods connecting said gate to the dumping-section, so that the gate is operated from the latter; the latch-levers pivoted to the beams and adapted to hold the dumping-section in filling position, the rock-shaft journaled on the front ends of the beams provided with arms and the rods connecting said arms to said latch-levers, all substantially as and for the purpose described.

In testimony that I claim the foregoing as my own I affix my signature in presence of two witnesses.

CHARLES M. HAESKE.

Witnesses:
GRACE C. ECCLESTON,
FREDK. S. FISH.